United States Patent
Matsuyama et al.

(10) Patent No.: US 7,874,737 B2
(45) Date of Patent: Jan. 25, 2011

(54) TAPERED ROLLER BEARING AND AUTOMOTIVE PINION SHAFT SUPPORTING APPARATUS UTILIZING SAME TAPERED ROLLER BEARING

(75) Inventors: Hiroki Matsuyama, Nara (JP); Hiroyuki Chiba, Kashiwara (JP); Kazutoshi Toda, Tondabayashi (JP)

(73) Assignee: JTEKT Corporation, Osaka (JP)

( * ) Notice: Subject to any disclaimer, the term of this patent is extended or adjusted under 35 U.S.C. 154(b) by 439 days.

(21) Appl. No.: 11/504,760

(22) Filed: Aug. 16, 2006

(65) Prior Publication Data

US 2007/0098317 A1    May 3, 2007

(30) Foreign Application Priority Data

Aug. 18, 2005    (JP) .................. P2005-237554

(51) Int. Cl.
*F16C 33/58*    (2006.01)
*F16C 19/00*    (2006.01)

(52) U.S. Cl. .................. 384/571; 384/450; 384/568

(58) Field of Classification Search .................. 384/450, 384/564, 565, 568, 569, 571

See application file for complete search history.

(56) References Cited

U.S. PATENT DOCUMENTS

| 5,007,747 A * | 4/1991 | Takeuchi et al. ............ 384/568 |
| 6,086,261 A | 7/2000 | Nakagawa et al. |
| 6,328,477 B1 * | 12/2001 | Tsujimoto et al. ........... 384/450 |
| 6,623,168 B2 * | 9/2003 | Matsuyama et al. ......... 384/571 |

FOREIGN PATENT DOCUMENTS

| JP | 3-113 | 1/1991 |
| JP | 3-12015 | 2/1991 |
| JP | 4-95318 | 8/1992 |
| JP | 5-87330 | 11/1993 |
| JP | 11-201151 | 7/1999 |
| JP | 2001-65574 | 3/2001 |
| JP | 2002-221223 | 8/2002 |
| JP | 2003-130059 | 5/2003 |
| JP | 2005-172113 | 6/2005 |
| WO | WO 2005/080813 A1 | 1/2005 |
| WO | WO 2005/100809 A1 | 10/2005 |

OTHER PUBLICATIONS

Japanese Office Action dated Dec. 8, 2009 (and English translation thereof).

* cited by examiner

*Primary Examiner*—Thomas R Hannon
*Assistant Examiner*—James Pilkington
(74) *Attorney, Agent, or Firm*—McGinn IP Law Group, PLLC

(57) ABSTRACT

A tapered roller bearing according to the invention is such that when an arithmetical mean roughness as a surface roughness of a large end face of a tapered roller is σ1 and an arithmetical mean roughness as a surface roughness of a large rib surface of an inner ring is σ2, σ1 is 0.04 μm or larger, and
a composite roughness that is expressed by a square root of a sum of a squared value of σ1 and a squared value of σ2 is 0.17 μm or smaller. Raceway surfaces of an outer ring and the inner ring and a rolling contact surface of the tapered roller are crowned, and a total crowning amount is set to 50 μm or larger, an outer ring crowning rate is set to 40% or larger, and a roller crowning rate is set to 20% or smaller.

21 Claims, 17 Drawing Sheets

TAPERED ROLLER BEARING AND AUTOMOTIVE PINION SHAFT SUPPORTING APPARATUS UTILIZING SAME TAPERED ROLLER BEARING

BACKGROUND OF THE INVENTION

The present invention relates to a tapered roller bearing which is preferably used in an automotive pinion shaft supporting apparatus as in a differential and a transaxle and in a transmission of a vehicle or the like, and an automotive pinion shaft supporting apparatus which uses the tapered roller bearing.

In recent years, there has been increasing a demand for improvement in fuel economy of motor vehicles, and in association with the demand, there is expressed a desire to reduce the running torque of tapered roller bearings which are used to support rotational shafts of transmissions and differentials installed on those motor vehicles.

In these situations, as a method of reducing the running torque of a tapered roller bearing, there is a method of reducing the rolling friction of a tapered roller bearing by crowning rolling contact surfaces of tapered rollers and raceway surfaces of inner and outer rings.

As the method like this, as is described in Patent Document No. 1 below, there is proposed, for example, a method in which raceway surfaces are crowned in an arc-shape fashion so as to realize a reduction in running torque, or, as is described in Patent Document No. 2 below, there is also proposed a method in which rolling contact surfaces of rollers and raceway surfaces which are brought into contact therewith are crowned to a shape which approximates to a logarithmic curve.

In the conventional examples, the performance of the tapered roller bearing was attempted to be enhanced by specifying the shape of the crown imparted to the raceway surface or the rolling contact surface by a numerical value. However, there had been no attempt to grasp the crown as quantity so as to specify the crowning amount so imparted to thereby reduce the running torque of the tapered roller bearing.

Patent Document No. 1: JP-A-2003-130059

Patent Document No. 2: JP-A-2001-65574

Incidentally, when the tapered roller bearing is used in an automotive pinion shaft supporting apparatus in a differential of a motor vehicle, for example, a preload is imparted to the relevant bearing for the purpose of securing rigidity and the like. The extent to which the preload is imparted to the tapered roller bearing is generally determined based on as an indication the value of an assembly torque which is measured as the running torque of the tapered roller bearing when it is assembled onto the automotive pinion shaft supporting apparatus. However, it is often the case that this assembly torque varies. In the even that the assembly torque varies, there may occur in a case where the preloading cannot be imparted accurately, leading to a risk that a preload that is imparted to the relevant bearing varies.

In the event that the preload that is imparted to this bearing varies, leading to a case where the preload is imparted to exceed an extent to which it should be, it constitutes a cause for a shorter life of the tapered roller bearing. On the other hand, in the event that the extent to which the preload is imparted becomes short, as a result, the rigidity of the tapered roller bearing becomes insufficient, and gear noise is generated. Furthermore, there has been caused a risk that the running torque is increased in use of the tapered roller bearing.

SUMMARY OF THE INVENTION

The invention is made in view of the situations, an object there of is to provide a tapered roller bearing which can reduce running torque by specifying, as quantity, crowning applied to rolling contact surfaces of tapered rollers and raceway surfaces of inner and outer rings, and an automotive pinion shaft supporting apparatus which utilizes the tapered roller bearing so provided.

According to the invention, there is provided a tapered roller bearing including an outer ring, an inner ring, a plurality of tapered rollers interposed between the outer ring and the inner ring and a cage for the tapered rollers, the inner and outer rings and the tapered rollers having raceway surfaces and rolling contact surfaces, respectively, which are crowned, wherein when an arithmetical mean roughness as a surface roughness of a large end face of the tapered roller is $\sigma 1$ and an arithmetical mean roughness as a surface roughness of a large rib surface of the inner ring is $\sigma 2$, $\sigma 1$ is 0.04 μm or larger, a composite roughness that is expressed by a square root of a sum of a squared value of $\sigma 1$ and a squared value of $\sigma 2$ is 0.17 μm or smaller, a total crowning amount (=outer ring crowning amount+inner ring crowning amount+roller crowning amount×2) is 50 μm or larger, an outer ring crowning rate (=outer ring crowning amount/total crowning amount) is 40% or larger, and a roller crowning rate (=(roller crowning amount×2)/total crowning amount) is 20% or smaller.

According to the tapered roller bearing that is configured as is described above, the total crowning amount of the crownings that are applied to the raceway surface and the rolling contact surfaces, the outer ring crowning rate and roller crowning rate are set to the preferred values, contact areas on each of the raceway surfaces and rolling contact surfaces can be reduced suitably, and the rolling viscous resistance between the inner and outer rings and the tapered rollers can be reduced.

Furthermore, in the tapered roller bearing, since the arithmetical mean roughness $\sigma 1$ of the large end face and the composite roughness a are set to the preferred values, the variability of assembly torque resulting when the tapered roller bearing is assembled can be suppressed.

In the tapered roller bearing, the arithmetical mean roughness $\sigma 1$ of the large end face of the tapered roller is preferably 0.1 μm or smaller, and the arithmetical mean roughness $\sigma 2$ of the large rib surface of the inner ring is preferably in the range from 0.03 to 0.11 μm.

In the event that the arithmetical mean roughness $\sigma 1$ of the large end face is larger than 0.1 μm, there is caused a risk that the running torque of the tapered roller bearing is increased. In the event that the arithmetical mean roughness $\sigma 2$ of the large rib surface is larger than 0.11 μm, there is caused a risk that the running torque of the tapered roller bearing is increased. Additionally, in the event that the arithmetical mean roughness $\sigma 2$ of the large rib surface is smaller than 0.03 μm, there is caused a risk that the variability of the running torque of the tapered roller bearing which includes the assembly torque is increased.

In the tapered roller bearing, the large rib surface of the inner ring is shaped into a concavely curved surface which is recessed axially, and when a curvature radius of the large end face of the tapered roller is R1 and a curvature radius of the concavely curved surface is R2, a ratio between the two curvature radiuses which is expressed by R1/R2 preferably falls within a range from 0.07 to 0.8.

In the event that R1/R2 is larger than 0.8, a so-called edge load is produced between the tapered rollers and the inner ring, which causes a risk that the running torque is increased or an abnormal wear is caused.

In the event that R1/R2 is smaller than 0.07, the curvature radius of the large rib surface becomes so large that the large rib surface can be regarded as almost a flat plane, and the contact surface between the large end face and the large rib surface is reduced. Due to this, the bearing pressure on the contact surface is increased, and an oil film becomes difficult to be formed between the large end face and the large rib surface, and the running torque tends to vary easily.

In the tapered roller bearing, the ratio between the two curvature radiuses which is expressed by R1/R2 preferably falls within a range from 0.07 to 0.35, and in this case, the extent of the range in which the running torque including the assembly torque can be suppressed effectively.

According to the invention, there is provided an automotive pinion shaft supporting apparatus having a pinion shaft and rolling bearings which are disposed on a pinion gear side and an opposite side thereto of the pinion shaft to support the pinion shaft, respectively, wherein at least one of the rolling bearings which are disposed on the pinion gear side and the opposite side thereto of the pinion shaft, respectively, is made up of the aforesaid tapered roller bearing.

According to the automotive pinion shaft supporting apparatus, as is described above, since the contact area on the raceway surface and the rolling contact surfaces can be reduced suitably and the rolling viscous resistance between the inner and outer rings and the tapered rollers can be reduced, the rotation loss of the automotive pinion shaft supporting apparatus can be reduced. Furthermore, since the variability of the assembly torque when the tapered roller bearing is assembled can be suppressed, the reduction in life and rigidity failure of the automotive pinion shaft supporting apparatus can be suppressed, and gear noise can be reduced.

According to the tapered roller bearing and the automotive pinion shaft supporting apparatus of the invention, the variability of preload can be suppressed by suppressing the variability of assembly torque, and the preload can be set to a preferred value. By applying the crowning which is set preferably as quantity to the rolling contact surface of the tapered roller and the raceway surfaces of the inner and outer rings, the contact area on the raceway surface and the rolling contact surfaces can be reduced suitably, and the rolling viscous resistance between the inner and outer rings and the tapered rollers can be reduced, whereby the running torque of the tapered roller bearing can be reduced effectively.

DETAILED DESCRIPTION OF PREFERRED EMBODIMENTS

Figure 1:
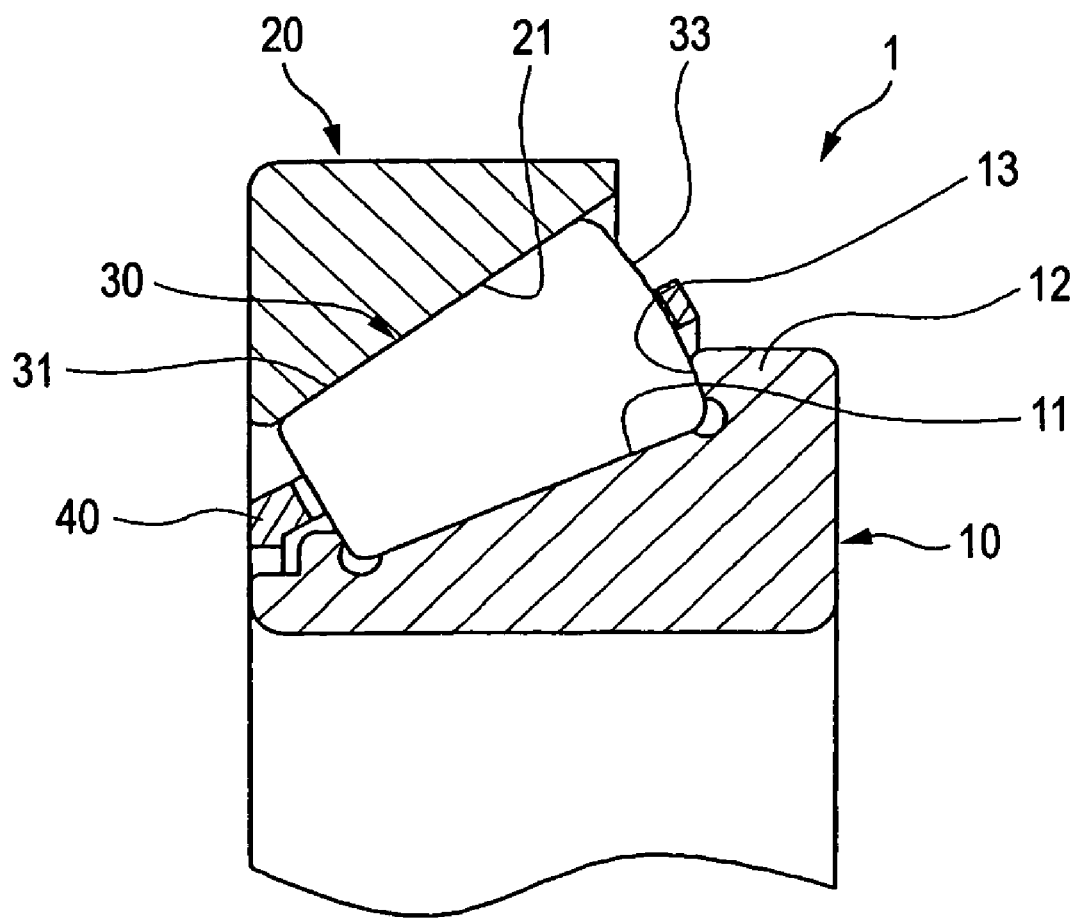
FIG. 1 is an axial sectional view of a tapered roller bearing according to an embodiment of the invention.

Next, referring to the accompanying drawings, a preferred embodiment of the invention will be described. FIG. 1 is an axial sectional view of a tapered roller bearing according to an embodiment of the invention.

In the figure, a tapered roller bearing 1 according to the embodiment includes an inner ring 10 having an inner ring raceway surface 11 made up of a conical surface on an outer circumference thereof, an outer ring 20 having an outer ring raceway surface 21 made up of a conical surface on an inner circumferential surface, a plurality of tapered rollers 30 each having a rolling contact surface 31 made up of a conical surface on an outer circumference thereof and disposed between both the raceway surfaces 11, 21 in such a manner as to roll freely therebetween, and a cage 40 for holding the plurality of tapered rollers 30 at predetermined intervals in a circumferential direction. The inner ring, the outer ring and the tapered rollers are made of bearing steel, for example.

Figure 2:
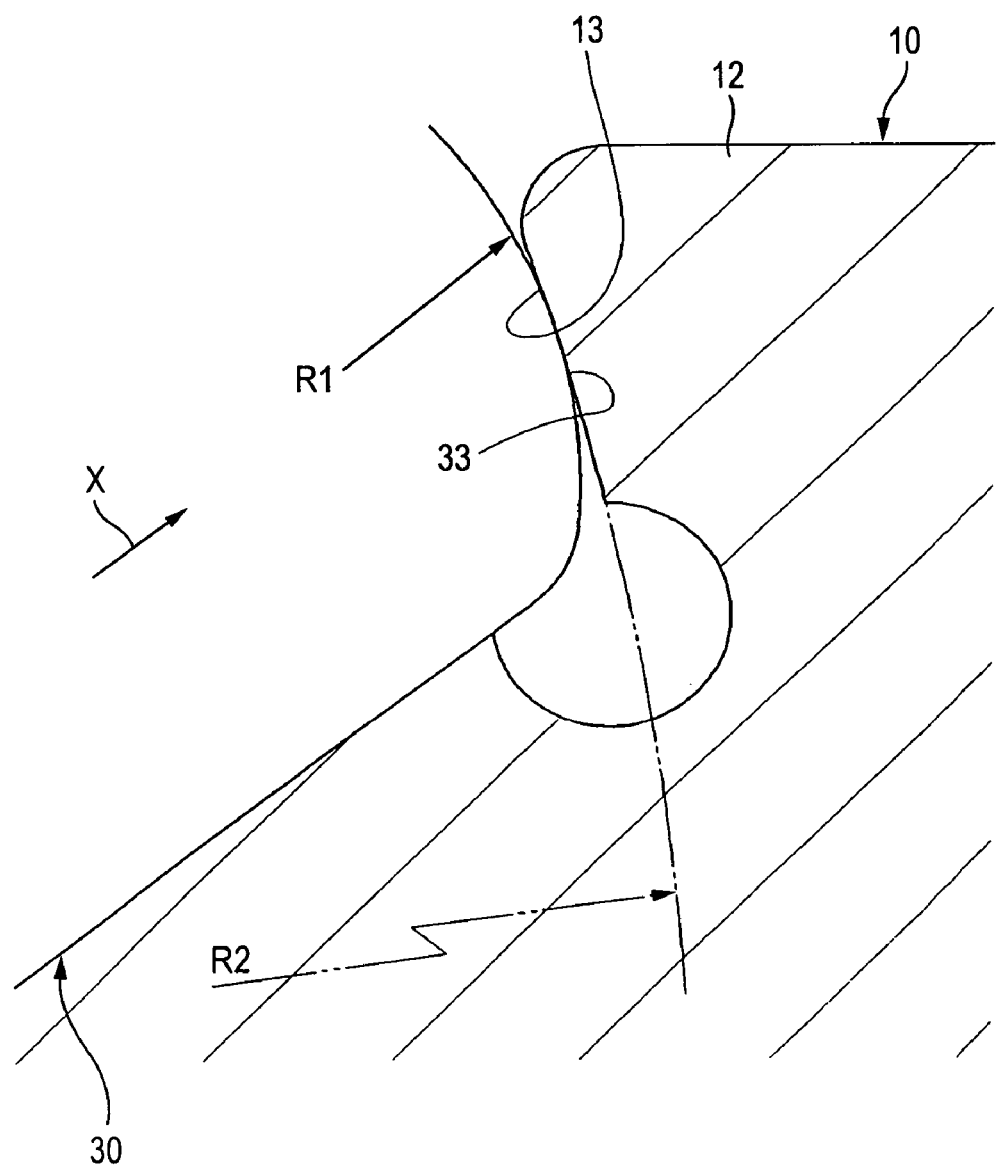
FIG. 2 is a partially enlarged view of FIG. 1.

As is shown in FIG. 2, a large end face 33 of the tapered roller 30 which is an end face on a large diameter side thereof is formed into a convexly curved surface which protrudes in an axial direction of the tapered roller 30 and which is made to have a curvature radius R1. A large flange 12 is formed on a large diameter side of the inner ring 10 in such a manner as to protrude radially outwards. A large rib surface 13, which is a side of the large flange 12 which contacts the tapered roller 30, is formed into a concavely curved surface which is recessed in the axial direction in such a manner as to match the large end face 33 which is formed into the convexly curved surface and is made to have a curvature radius R2.

The inner ring raceway surface 11, the outer ring raceway surface 21 and the rolling contact surfaces 31 are crowned, which is one of characteristic configurations of the invention.

Figure 3A:
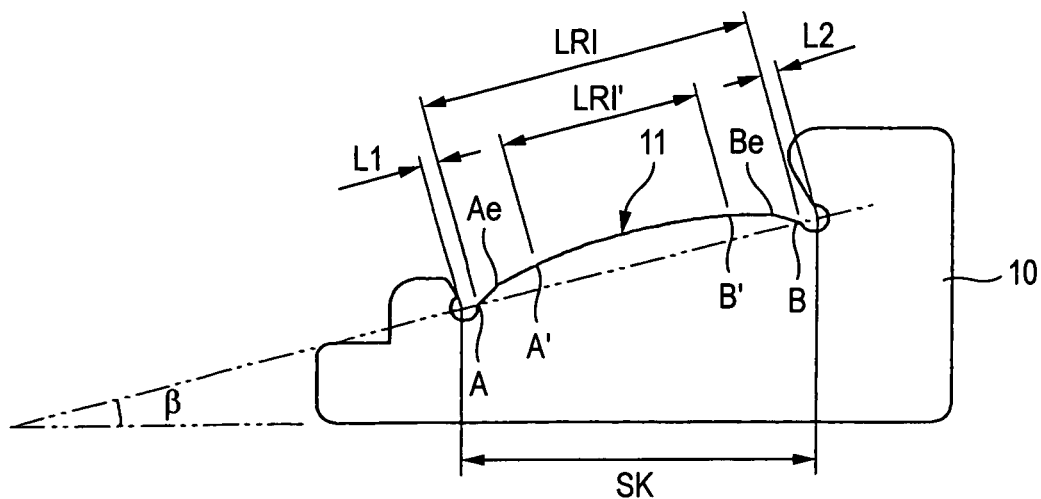
FIGS. 3A and 3B are diagrams showing the shape of a crowning (a composite crowning) on an inner ring, FIG. 3A showing a contour of the inner ring, and FIG. 3B showing exemplarily the shape of the crowning which is applied to a raceway surface of the inner ring.

Here, a general concept of crowning will be described by taking the inner ring as an example. FIG. 3A is a diagram showing exaggeratedly a contour of an axial section of the inner ring 10 of which the inner ring raceway surface 11 is crowned. In the figure, a crowning is applied to the inner ring raceway surface 11 which contacts the rolling contact surface 31 of the tapered roller 30 in such a manner as to protrude slightly radially outwards. This crowning shows a composite crowning having a trapezoidal shape in which an arc constitutes an upper side of the trapezoid.

Hereinafter, a calculation method of a crowning amount that is applied to the inner ring 10 (hereinafter, also referred to as an inner ring crowning amount) will be described. In FIG. 3A, when the width of the inner ring raceway surface 11 with respect to the axial direction of the inner ring 10 is SK, a tapered angle of the inner ring raceway surface 11 is $\beta$, and chamfered dimensions shown as formed along both edge portions of the inner ring raceway surface 11 are L1, L2, a raceway length LRI is obtained by the following equation (1):

$$LRI = SK/\cos \beta - (L1+L2) \tag{1}$$

Here, a length LRI' is defined from a center point of the raceway length LRI as shown in the figure in such a manner that LRI'=0.6 LRI, and points on the inner ring raceway surface 11 which correspond to ends of the dimension LRI' are represented by A' and B', respectively. Note that while, in this case, A', B' reside inwards of end points Ae, Be of the arc, respectively, A', B' may coincide with the end points Ae, Be of the arc, respectively.

Figure 3B:
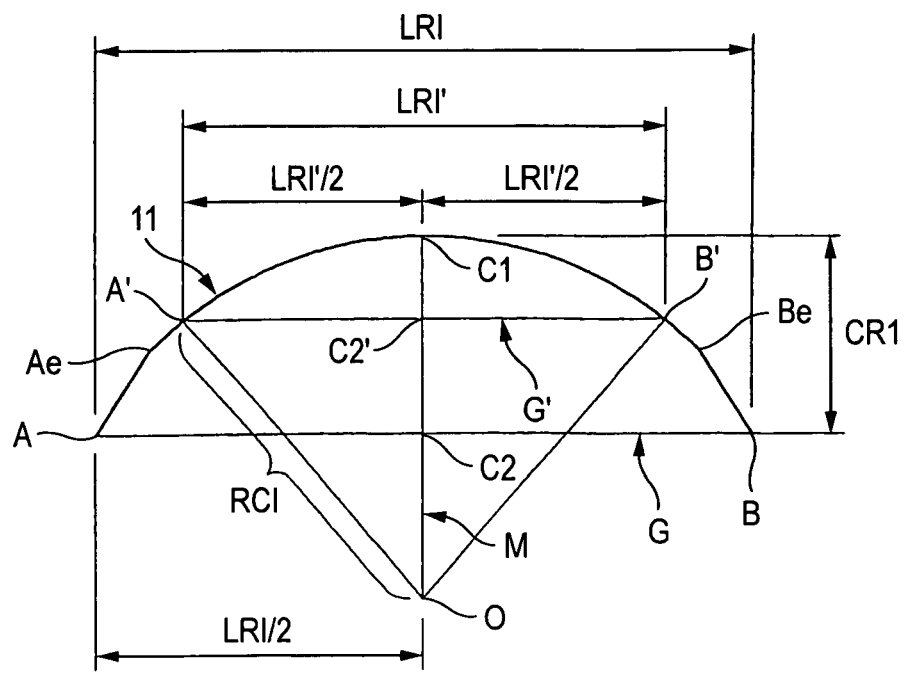

FIG. 3B is a diagram which shows exemplarily a section of the crowning between an end point A and an end point B of the raceway length LRI of the inner ring raceway surface 11 shown in FIG. 3A. In FIG. 3B, a straight line M which passes through a center point C2' of a chord G' of the crowning at the length LRI' and a center O of the arc of the crowning intersects the chord G' at right angles and passes through a central point C1 of the arc of the crowning at the length LRI'. A distance dimension from the central point C1 of the arc of the crowning to a middle point C2 of a chord G of the crowning at the raceway length LRI is represented by the crowning amount CRI of the inner ring 10.

Note that the shape of the inner ring crowning is not limited to the trapezoidal shape in which the arc constitutes the upper side as shown in FIGS. 3A and 3B, and hence, a crowning shape of every kind may be adopted which includes a shape made up of a single arc, a shape made up of a plurality of arcs, a logarithmic crowning, an oval crowning and the like, and the aforesaid concept of the crowning amount can be applied to all those crowning shapes.

The concept of crowning can be applied to the rollers and the outer ring, as well. Furthermore, the definition of the crowning amount can be applied to the rollers and the outer ring.

Note that a crowning made up of a combination of a plurality of shapes within the range of the raceway length (the raceway surface length) is referred to as a composite crowning, and a crowning made up of a single arc shape within the range of the raceway length is referred to as a full crowning.

Next, the concept of crowning and the concept of the crowning amount when an applied crowning is the full crowning will be described. At the same time, the concept of crowning for the tapered roller and the outer ring will also be described.

Figure 4A:
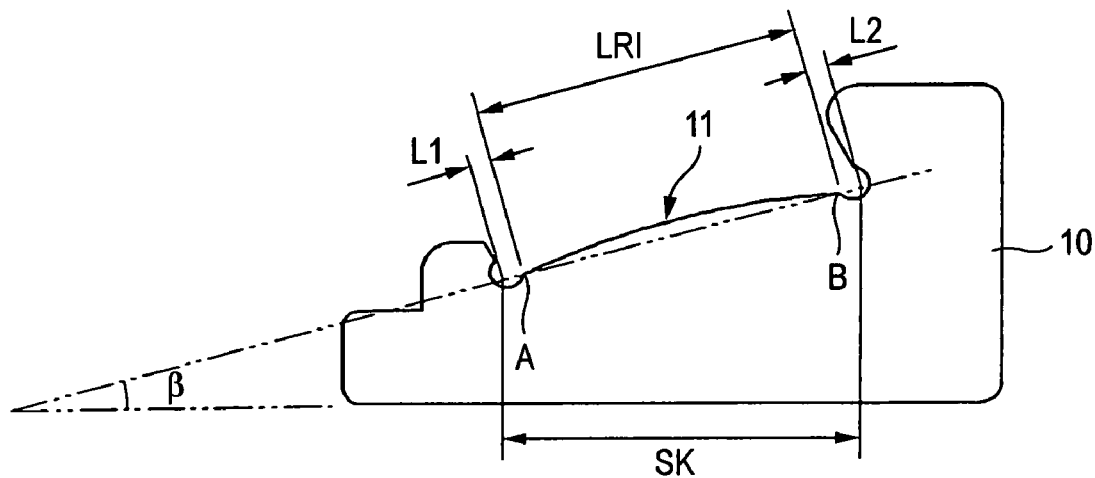
FIGS. 4A and 4B are diagrams showing the shape of a crowning (a full crowning) on the inner ring, FIG. 4A showing a contour of the inner ring, and FIG. 4B showing exemplarily the shape of the crowning which is applied to the raceway surface of the inner ring.

FIG. 4A is a diagram showing a contour of an axial section of the inner ring 10 in which a full crowning is applied to the inner ring raceway surface 11 thereof. In the figure, a raceway length LRI is obtained by the same equation as that used to obtain the LRI of the raceway shown in FIG. 3A:

$$LRI = SK/\cos \beta - (L1+L2)$$

Figure 4B:
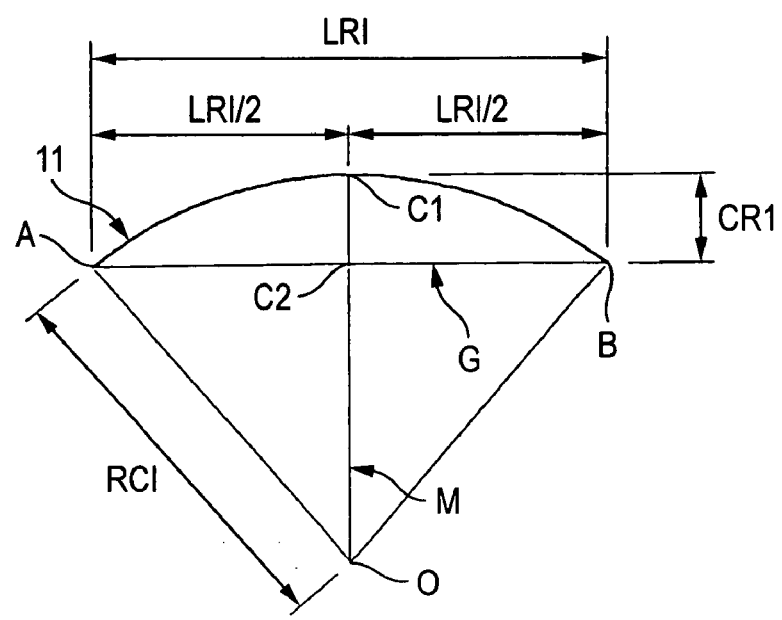

On the other hand, FIG. 4B is a diagram which shows exemplarily a section of the crowning between an end point A and an end point B of the raceway length LRI of the inner ring raceway surface 11 shown in FIG. 4A. In the figure, a straight line M which passes through a middle point C2 of a chord G of the crowning at the length LRI and a center O of an arc of the crowning intersects the chord G at right angles and passes through a central point C1 of the arc of the crowning at the length LRI. A distance dimension defined by the central point C1 of the arc of the crowning and the middle point C2 is represented by an inner ring crowning amount CRI. Namely, assuming that the radius of the crowning arc is RCI as shown in the figure, the inner ring crowning amount CRI is obtained by the following equation (2):

$$CRI = RCI - \{RCI^2 - (LRI/2)^2\}^{1/2} \tag{2}$$

Figure 5A:
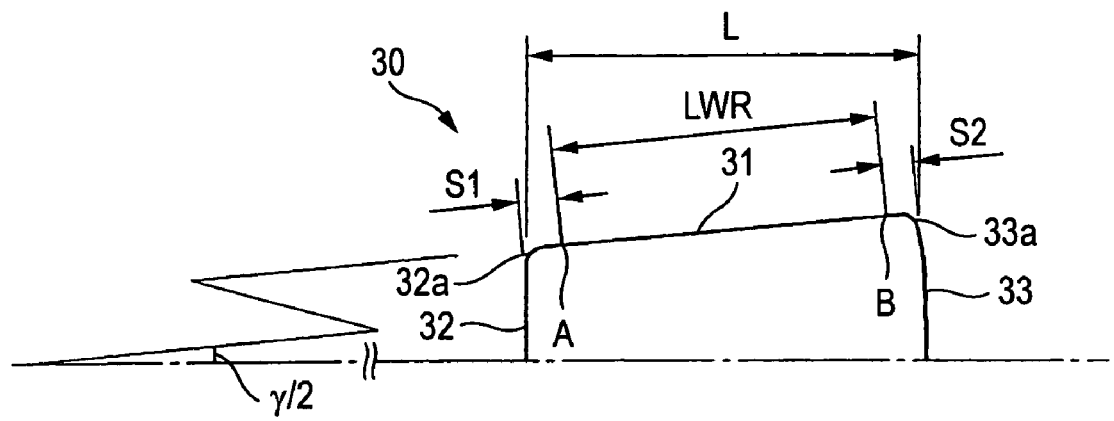
FIGS. 5A and 5B are diagrams showing the shape of a crowning on a tapered roller, FIG. 5A showing a contour of an upper half of an axial section of a tapered roller 30, and FIG. 5B showing exemplarily the shape of the crowning which is applied to a rolling contact surface of the tapered roller.

FIG. 5A is a diagram showing a contour of an upper half of an axial section of the tapered roller 30. In the figure, a rolling contact surface 31 is provided on the tapered roller 30 which is brought into rolling contact with the raceway surfaces 11, 21 of the inner and outer rings. Chamfered portions 32a, 33a are provided at both end portions of the rolling contact surface 31, respectively, and the chamfered portions are formed in such a manner as to continue to a small end face 32 which is an end face of a small diameter side of the tapered roller 30 and the large end face 33, respectively, in a smooth fashion. A full crowning is applied to the rolling contact surface 31 in such a manner as to protrude slightly radially outwards.

A method of calculating an amount of crowning applied to the tapered roller 30 (hereinafter, also referred to as a roller crowning amount) will be described hereinafter. In FIG. 5A, assuming that a roller length, which is a width of the rolling contact surface 31 with respect to a center axis direction of the tapered roller 30, is L, a tapered angle of the rolling contact surface 31 is $\gamma$, and width dimensions over which curved surfaces of the chamfered portions 32a, 33a which are formed at both the end portions of the rolling contact surface 31 are removed from a total width of the rolling contact surface are S1, S2, the aforesaid roller effective length LWR of the tapered roller is obtained by the following equation (3):

$$LWR = L/\cos(\gamma/2) - (S1+S2) \tag{3}$$

Note that constant values are determined for S1, S2 in the equation depending on the size of a bearing.

Figure 5B:
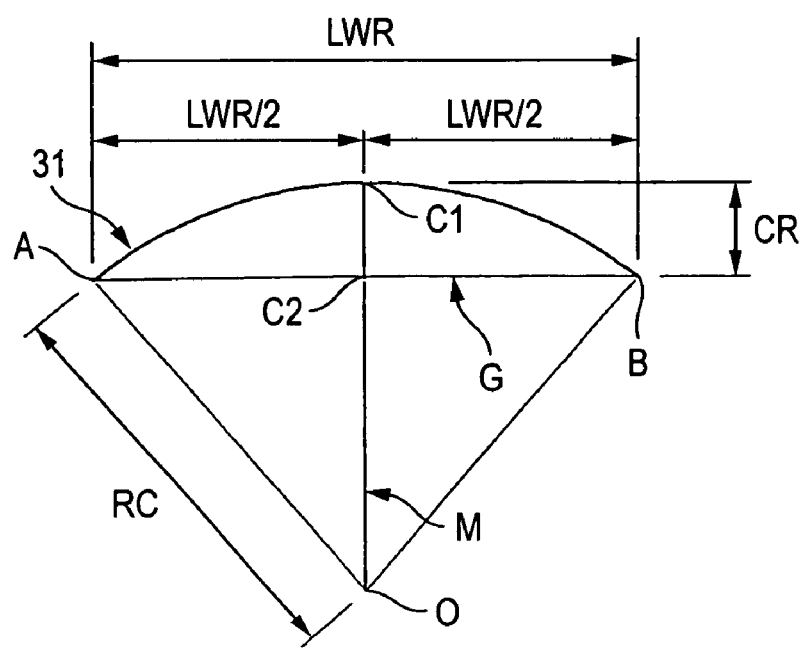

FIG. 5B is a diagram which shows exemplarily the shape of the crowning between an end point A and an end point B of the roller effective length LWR of the rolling contact surface 31 shown in FIG. 5A. In the figure, a straight line M which passes through a middle point C2 of a chord G of the crowning at the roller effective length LWR and a center O of an arc of the crowning intersects the chord G at right angles and passes through a central point C1 of the arc of the crowning at the roller effective length LWR.

In this specification, a distance dimension between the crowning arc central point C1 and the middle point C2 is represented by a crowning amount CR. Assuming that the radius of the crowning arc is RC as shown in the figure, the roller crowning amount CR is obtained by the following equation (4):

$$CR = RC - \{RC^2 - (LWR/2)^2\}^{1/2} \quad (4)$$

Figure 6A:
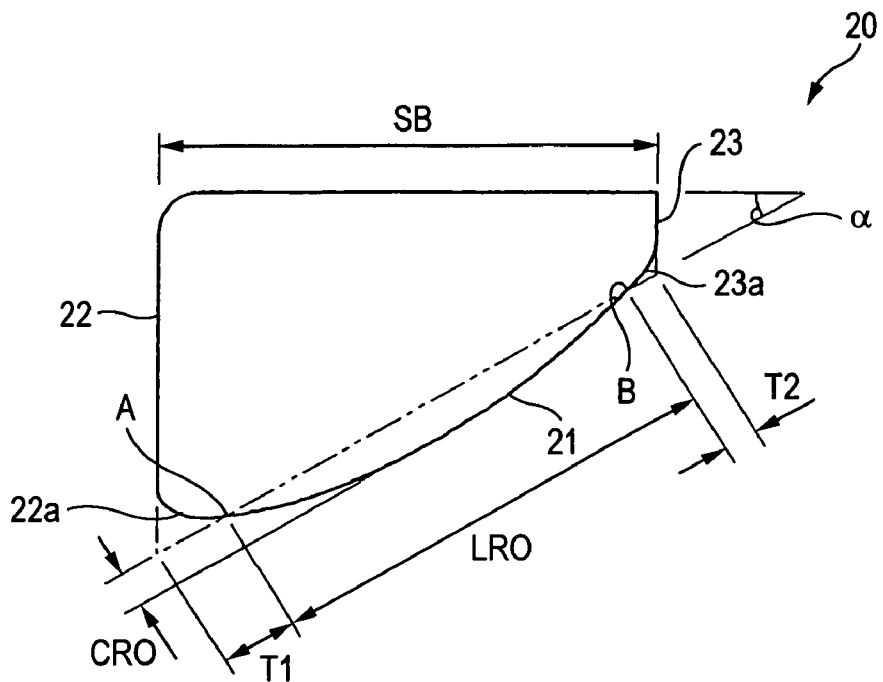
FIGS. 6A and 6B are diagrams showing the shape of a crowning on an outer ring, FIG. 6A showing a contour of the outer ring, and FIG. 6B showing exemplarily the shape of the crowning which is applied to a raceway surface of the outer ring.

Next, a method of calculating a crowning amount applied to the outer ring 20 in which a full crowning is applied to the raceway surface thereof (hereinafter, also referred to as an outer ring crowning amount) will be described. FIG. 6A is a diagram which shows exaggeratedly a contour of an axial section of the outer ring 20 in which a full crowning is applied to the outer ring raceway surface 21. In the figure, a crowning having a radially inwardly projecting arc-shaped section is applied to the outer ring raceway surface 21 which is brought into rolling contact with the rolling contact surface 31 of the tapered roller 30. Chamfered portions 22a, 23a are provided from both end portions towards axial end faces thereof, respectively. These chamfered portions 22a, 23a are formed in such a manner as to continue to a small inside diameter side end face 22 and a large inside diameter side end face 23, respectively, in a smooth fashion.

In FIG. 6A, assuming that a width of the outer ring raceway surface 21 with respect to an axial direction of the outer ring 20 is SB, a tapered angle of the outer ring raceway surface 21 is $\alpha$, and width dimensions over which curved surfaces of the chamfered portions 22a, 23a which are formed at both the end portions of the outer ring raceway surface 21 are removed from a total width of the outer ring raceway surface are T1, T2, the aforesaid raceway length LRO is obtained by the following equation (5):

$$LRO = SB/\cos\alpha - (T1 + T2) \quad (5)$$

Note that constant values are determined for T1, T2 in the equation depending on the size of a bearing.

Figure 6B:
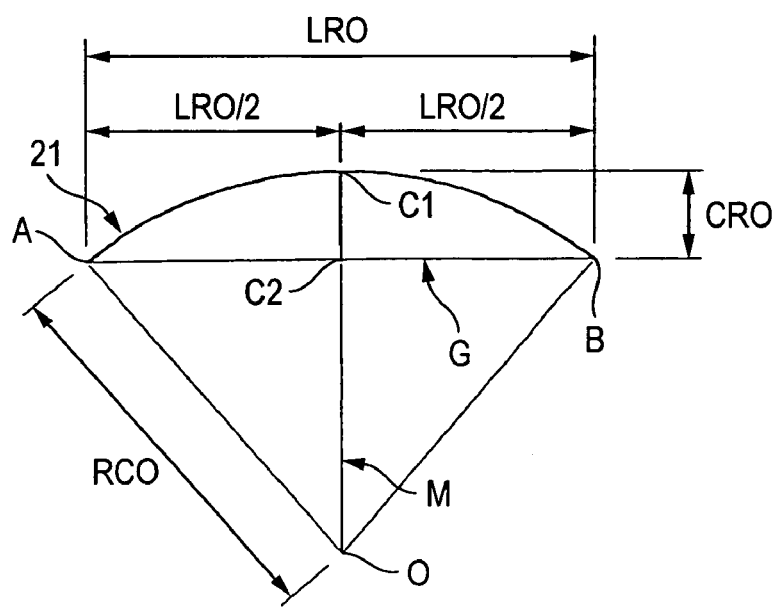

FIG. 6B is a diagram which shows exemplarily the shape of the crowning between an end point A and an end point B of the raceway length LRO of the outer ring raceway surface 21 shown in FIG. 6A. In the figure, a straight line M which passes through a middle point C2 of a chord G of the crowning at the raceway length LRO and a center O of an arc of the crowning intersects the chord G at right angles and passes through a central point C1 of the arc of the crowning at the raceway length LRO.

In this specification, a distance dimension between the crowning arc central point C1 and the middle point C2 is defined as a crowning amount CRO. Assuming that the radius of the crowning arc is RCO as shown in the figure, the outer ring crowning amount CRO is obtained by the following equation (6):

$$CRO = RCO - \{RCO^2 - (LRO/2)^2\}^{1/2} \quad (6)$$

The crowning amounts of the tapered roller and the inner and outer rings when the full crownings are applied thereto can be obtained in the ways described above.

Note that crowning amounts can, of course, be calculated based on the general concept of crowning that has been described before for the tapered roller 30 and the inner and outer rings 10, 20 to which the full crownings are applied. Namely, similar to the case where the length LRI' is obtained in FIGS. 3A and 3B, an LWR' with respect to the LWR for the tapered roller 30 and an LRO' with respect to the LRO for the outer ring 20 may be obtained. The crowning amounts obtained based on the general concept of crowning in this way substantially coincide with the values obtained based on the concept of full crowning (FIGS. 5A to 6B).

In this specification, a total crowning amount, an outer ring crowning rate, a roller crowning rate and an inner ring crowning rate are calculated from the aforesaid the roller crowning amount, the inner ring crowning amount and the outer ring crowning amount based on the following equations (7), (8), (9), (10):

Total crowning amount=outer ring crowning amount+ inner ring crowning amount+roller crowning amount×2     (7)

Outer ring crowning rate=outer ring crowning amount/total crowning amount     (8)

Roller crowning rate=(roller crowning amount×2)/ total crowning amount     (9)

Inner ring crowning rate=inner ring crowning amount/ total crowning amount     (10)

In the tapered roller bearing according to the embodiment, running torque is reduced while suppressing the variability of the preload to be applied by controlling the total crowning amount, outer ring crowning rate, roller crowning rate, surface roughness of the large end face 33 of the tapered roller 30, surface roughness of the large rib surface 13 of the inner ring 10, curvature radius of the large end face 33 and curvature radius of the inner ring 10, respectively. The results of a study that was made on relationships between controlled values of the afore-raised factors and the preload and running torque of the tapered roller bearing will be described below.

Relationship Between Running Torque, Total Crowning Amount and Respective Crowning Rates Firstly, the results of an investigation test carried out to clarify the relationship between the total crowning amount and the respective crowning rates in an actual utilization state where the tapered roller bearing is actually used will be described.

As tapered roller bearings used in this test, a number of tapered roller bearings (such as to correspond to JIS30306) having the configuration shown in FIG. 1 were prepared which were set such that their total crowning amounts and respective crowning rates differed, and running torques of the tapered roller bearings so prepared were measured experimentally.

As a method of measuring running torques of the tapered roller bearings, for example, a bearing testing apparatus was used, and after the tapered roller bearings according to the embodiment were each set on the testing apparatus, one of the inner and outer rings was rotated to measure a running torque acting on the other of the inner and outer rings. As testing conditions, gear oil for differentials was used as a lubricant, an axial load of 4 kN was applied as a dummy load for preload, and two rotational speeds, 300 rpm and 2000 rpm, were used. Running torques which would result in an actually used state are measured.

As a lubricating condition for the test, when the rotational speed of 300 rpm was used, the lubricant at the normal temperature was only applied before the test, and thereafter no lubricant was applied during the test. On the other hand, when the rotational speed of 2000 rpm was used, the lubricant at an oil temperature of 323 K (50° C.) was supplied in circulation in an amount of 0.5 liter per minute during the test. The reason the different methods of supplying the lubricant were used according to the rotational speeds used was that only a required minimum amount of the lubricant for each of the rotational speeds was made to be supplied so as to eliminate the possibility of being affected by resistance to stirring which would be produced when the lubricant is supplied excessively to thereby extract a running torque produced by rolling friction.

A running torque was measured on each of the tapered roller bearings in which the total crowning amounts and respective crowning rates were set to different values. Then, a range of values which reduce running torque was specified by grasping a relationship between the total crowning amount and respective crowning rates, and the running torque.

Figure 7:
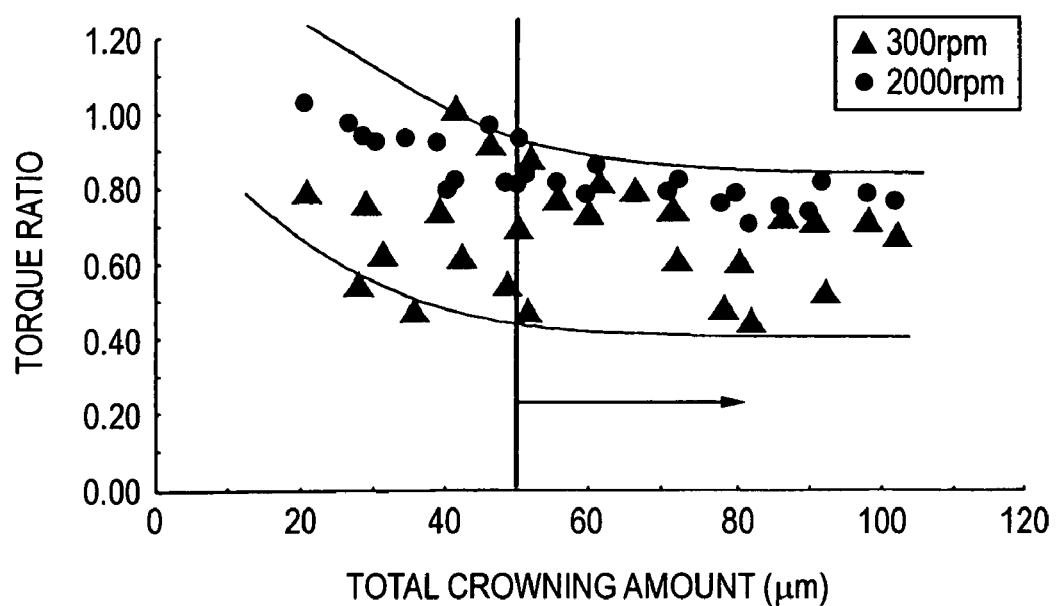
FIG. 7 is a scatter diagram showing a relationship between a total crowning amount and a torque ratio of the tapered roller bearing.

FIG. 7 is a scatter diagram showing the relationship between the total crowning amount and a torque ratio (a running torque/a predetermined value) of the tapered roller bearings on which measurements were carried out. As is clear from the diagram, while the torque ratio scatters over a wide width when the total crowning amount is 50 μm or smaller, there is shown a tendency in which a maximum value of the torque ratio so scattering gradually decreases as the total crowning amount increases. When the total crowning amount is 50 μm or larger, it is seen that the torque ratio is stably distributed within a range of lower values, compared to the case where the total crowning amount is 50 μm or smaller.

When the total crowning amount exceeds 100 μm, excessive crownings are applied to the tapered roller and the inner and outer rings, leading to a risk that the tapered roller does not roll in a stable fashion. Consequently, the total crowning amount is preferably 100 μm or smaller.

Figure 8:
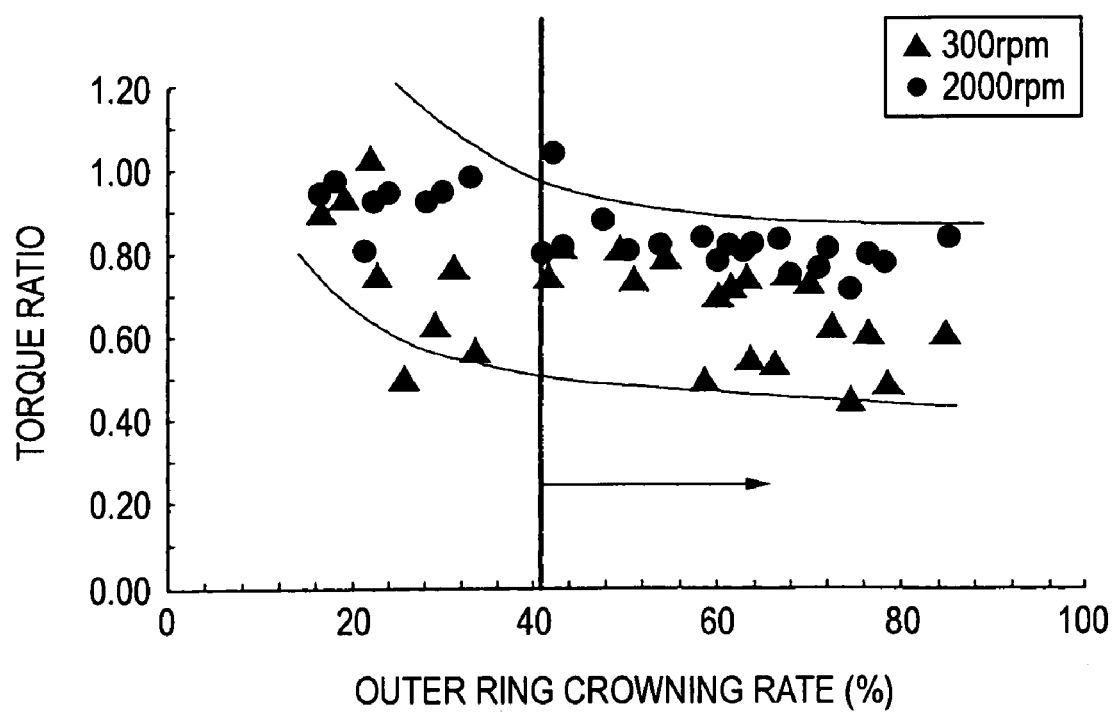
FIG. 8 is a scatter diagram showing a relationship between an outer ring crowning rate and the torque ratio of the tapered roller bearing.

Next, FIG. 8 is a scatter diagram showing the relationship between the outer ring crowning rate and the torque ratio of the tapered roller bearings. As is clear from the diagram, when the outer ring crowning rate is 40% or smaller, a maximum value of the torque ratio gradually decreases as the outer ring crowning rate increases. When the outer ring crowning rate is 40% or larger, it is seen that the torque ratio is stably distributed within a range of lower values, compared to the case where the outer crowning rate is 40% or smaller.

Figure 9:
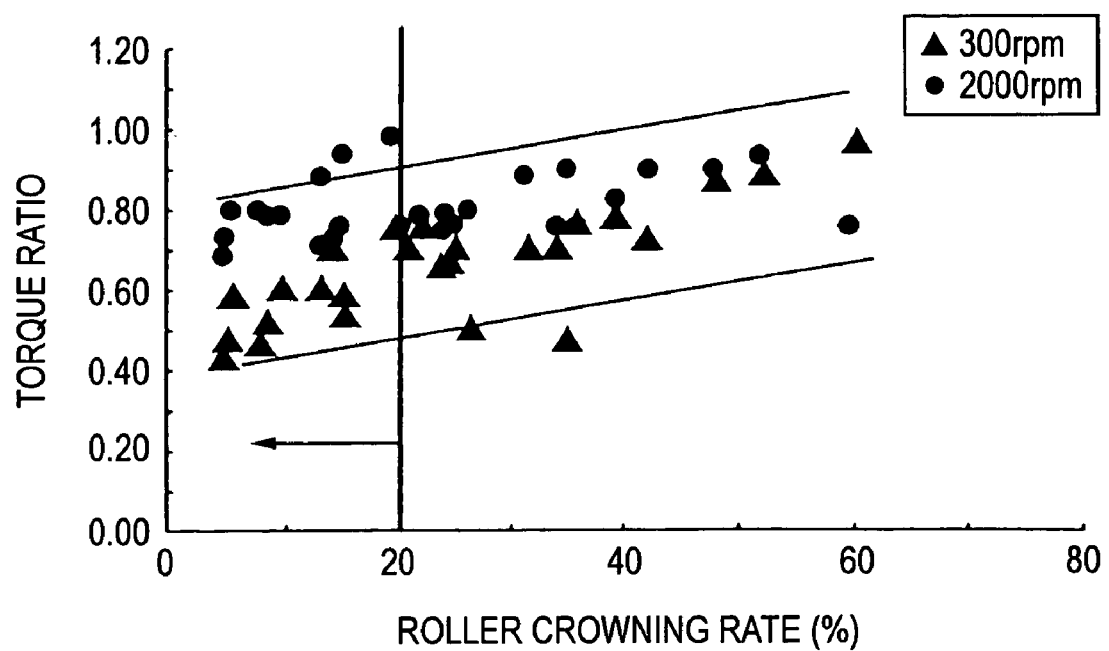
FIG. 9 is a scatter diagram showing a relationship between a roller crowning rate and the torque ratio of the tapered roller bearing.

FIG. 9 is a scatter diagram showing the relationship between the roller crowning rate and the torque ratio of the tapered roller bearings. As is clear from the diagram, when the roller crowning rate is 20% or larger, a maximum value of the torque ratio gradually decreases as the roller crowning rate reduces. When the roller crowning rate is 20% or smaller, it is seen that the torque ratio is stably distributed within a range of smaller values compared to the case where the roller crowning rate is 20% or larger.

Figure 10:
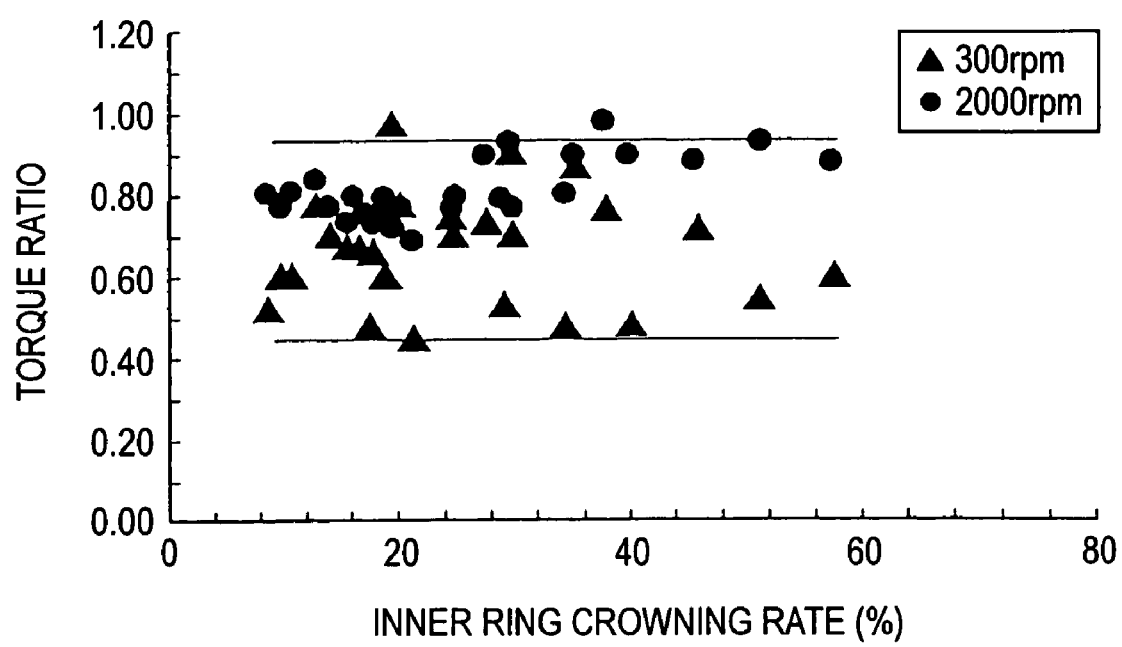
FIG. 10 is a scatter diagram showing a relationship between an inner ring crowning rate and the torque ratio of the tapered roller bearing.

FIG. 10 is a scatter diagram showing the relationship between the inner ring crowning rate and the torque ratio of the tapered roller bearings. As is clear from the diagram, the torque ratio is stable within a substantially constant range as the inner crowning rate varies. Namely, no remarkable correlation with respect to the torque ratio of the tapered roller bearings was identified. However, contact loads produced in the vicinity of axial end portions of the contact surface between the inner ring raceway surface 11 and the rolling contact surface 31 can be reduced by setting the inner ring crowning rate to 10% or larger, whereby, even in the event that a so-called edge load is applied, the effect of the edge load can be reduced, so as to prevent the reduction in service life of the tapered roller bearing.

As has been described heretofore, as a result of experimental measurements and study on the relationship between the running torque ratio of the tapered roller bearings, that is, the running torques in the actually utilized state of the tapered roller bearings, and the total crowning amount and the respective crowning rates, a view could be obtained that the running torque in the actually utilized state of the tapered roller bearings can be reduced by satisfying the conditions that the total crowning amount is 50 μm or larger, the outer ring crowning rate is 40% or larger and the roller crowning rate is 20% or smaller.

While the outer ring crowning rate may be 100%, when considering the fact that the inner ring crowning is applied by 10% or larger as has been described above, the outer ring crowning rate is preferably 90% or smaller.

Further, in the event that the roller crowning rate is 0%, with the outer ring crowning rate and the inner ring crowning rate staying within the aforesaid predetermined ranges, the effect of reducing the running torque can be obtained. Consequently, the roller crowning rate may only have to be set in a range from 0% or larger to 20% or smaller.

Since the outer ring is crowned to realize an outer ring crowning rate of 40% or larger, the inner ring crowning rate is preferably 60% or smaller.

The running torques of the tapered roller bearings measured in the aforesaid investigation test are those measured in the state where the effect of the resistance to stirring of the lubricant was eliminated as much as possible and are running torques that were affected largely by the rolling viscous resistance between the tapered rollers and the inner and outer rings.

Namely, according to the results of the investigation test, it is understood that the rolling viscous resistance between the inner and outer rings and the tapered rollers is reduced by setting the total crowning amount of the crownings applied to the rolling contact surface of the tapered roller 30 and the raceway surfaces of the inner and outer rings, the outer ring crowning rate and the roller crowning rate to the aforesaid conditions.

That is, according to the tapered roller bearing 1 according to the embodiment, as has been described above, the rolling viscous resistance between the tapered rollers 30 and the inner and outer rings 10, 20 can be reduced, and the rolling friction therebetween can be reduced. As a result, the running torque as of the tapered roller bearing 1 can be reduced.

In particular, in the automotive pinion shaft supporting apparatus in the differential, since bearings used therein are lubricated by a gear lubricant having a relatively high viscosity, the rolling viscous resistance of the bearings tends to be increased. Consequently, by using the tapered roller bearing according to the invention in the automotive pinion shaft supporting apparatus, the effect of running torque reduction thereby becomes remarkable.

Next, paying attention to the shape and surface roughness of the large end face of the tapered roller and the large rib surface of the inner ring of the tapered roller bearing, the results of an investigation will be described which was carried out on effects imposed on the preload and running torque of the tapered roller bearing by the shape and surface roughness of the tapered roller and the large rib surface.

Relationship Between Composite Roughness σ and Preload of the Tapered Roller Bearing Here, assuming that an arithmetical mean roughness (Ra) as a surface roughness of the large end face 33 of the tapered roller 30 is σ1 and an arithmetical mean roughness as a surface roughness of the large rib surface 13 of the inner ring 10 is σ2, in this specification, a composite roughness σ is defined as a square root of a sum of a squared value of σ1 and a squared value of σ2 as shown in the following equation (11):

$$\text{Composite roughness } \sigma = (\sigma 1^2 + \sigma 2^2)^{1/2} \quad (11)$$

The results of an investigation test will be described which was carried out on a preload change due to the composite roughness σ in an initial stage of the use of the tapered roller bearing.

As tapered roller bearings for use in the test, a plurality of tapered roller bearings were prepared in which the value of the composite roughness a was set to predetermined values in a range from 0.05 to 0.32 μm, and R1/R2 which is a ratio of a curvature radius R1 of the large end face 33 and a curvature radius R2 of the large rib surface 13 was set to predetermined values in a range of 0.8 or smaller. After these tapered roller bearings were assembled under a constant position preload (5.5 kN), inner rings and outer rings were rotated relatively for 20 hours under such a testing condition that the rotational speed was 2000 rpm, a gear oil of 85W-90 was used, and the oil temperature of the gear oil was 343 K (70° C.), and preloads of the tapered roller bearings were measured after they had been cooled, so that the tapered roller bearings were evaluated by preload residual rates which represent in percentage a degree at which the preload was reduced during the test.

Figure 11:
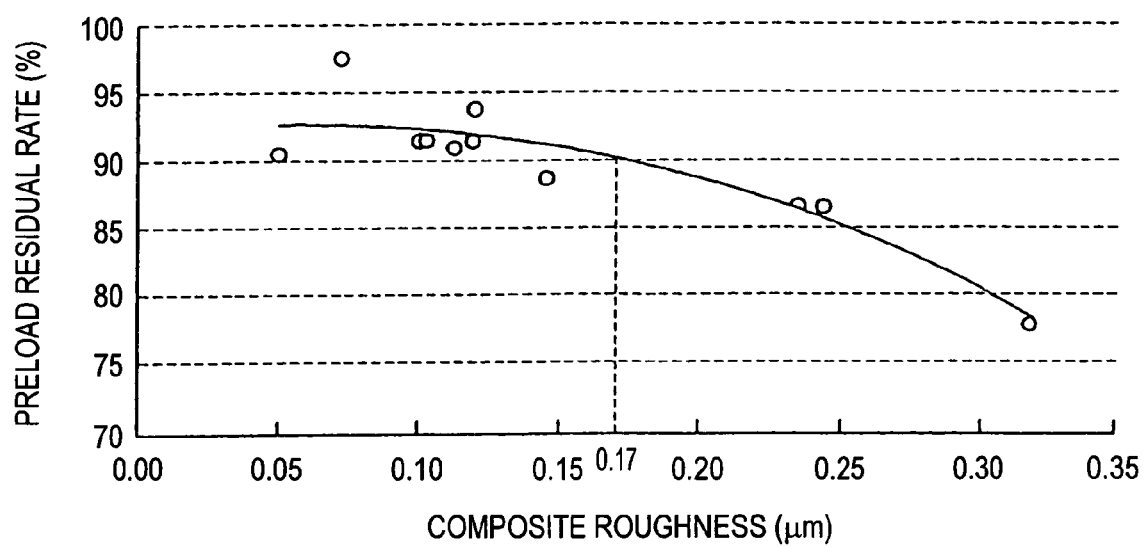
FIG. 11 is a scatter diagram showing a relationship between composite roughness and preload residual rate.

FIG. 11 is a scatter diagram showing the relationship between the composite roughness σ and the preload residual rate. In the diagram, a curve H is a curve obtained by regressing a plurality of measuring points plotted in the diagram thereto in a curvilinear fashion. According to this curve H, as the value of the composite roughness σ increases, the preload residual rate gradually decreases. The value of the composite roughness a when the preload residual rate is 90% is 0.17 μm.

The preload residual rate indicates how much the preload which resulted when the tapered roller bearing was assembled has decreased in an initial stage of the use thereof, and it is confirmed that a preload residual rate of 90% or larger is necessary and sufficient. Since the preload decreases little with a large preload residual rate, the variability of preload can be suppressed as a result.

Consequently, it was found from the results of the test that the preload residual rate that the tapered roller bearing needs could be maintained and the variability of the preload could be suppressed by making the value of the composite roughness σ be 0.17 μm or smaller.

A large reduction in preload or escape of preload when the tapered roller bearing is put to an actual use can be prevented by making the value of the composite roughness a be 0.17 μm or smaller.

Relationship Between the Respective Arithmetical Mean Roughnesses σ1, σ2 of the Large End Face and the Large Rib Surface, and the Running Torque Next, the results of an investigation test will be described which was carried out on effects imposed on running torque by the respective surface roughnesses of the large end face of the tapered roller and the large rib surface of the inner ring. As tapered roller bearings for use in the test, tapered roller bearings in which the surface roughness of the large end face and the surface roughness of the large rib surface were set to predetermined values respectively were used. Inner and outer rings of the tapered roller bearings were rotated relatively under such a testing condition that a rust preventive oil was applied, the axial load was 5.5 kN, the rotational speed was 50 rpm, and the room temperature (oil temperature) was 288 to 294 K (15 to 21° C.), so that a change in fluctuation width of the running torque (running torque ratio) of each of the tapered roller bearings was measured during the relative rotation of the inner and outer rings. Note that the testing condition is a condition in which a measuring condition of an assembly torque that is to be measured when a preload is applied immediately after the tapered roller bearing has been assembled is reproduced, so that the assembly torque of the tapered roller bearing can be measured artificially by measuring a running torque in this test so conditioned.

Figure 12:
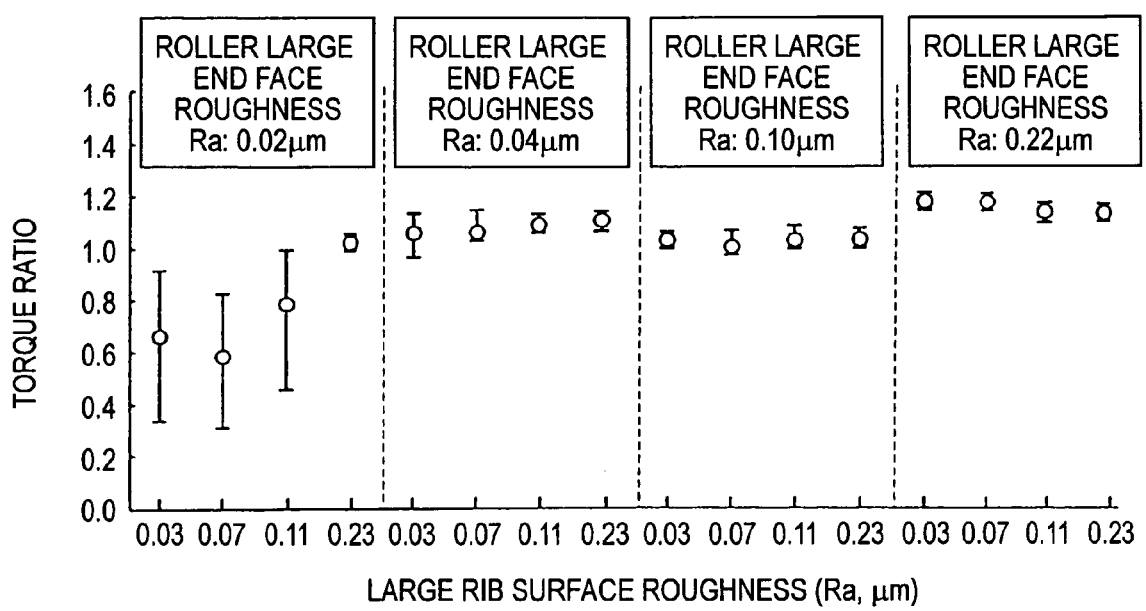
FIG. 12 is a diagram showing a relationship between surface roughnesses of a large end face and a large rib surface and a running torque ratio.

FIG. 12 is a diagram showing a relationship between the surface roughnesses of the large end face and the large rib surface and the running torque ratio (running torque/predetermined value). In the diagram, the abscissa axis represents the arithmetical mean roughness σ2 of the large rib surface with respect to the arithmetical mean roughness σ1 of the large end face in which four different predetermined values (0.02, 0.04, 0.10, 0.22 μm) were set, and the ordinate axis represents the running torque ratio. In each torque ratio, a value resulting from the measurement is shown as a numerical value width so as to represent the variability of the torque ratio.

In the diagram, when the arithmetical mean roughness σ1 of the large end face is 0.02 μm, the running torque ratios of the tapered roller bearings vary within a range width of 0.5 to 0.6. On the other hand, when the arithmetical mean roughness σ1 of the large end face takes the other values (0.04, 0.10, 0.22 μm), while the rotational ratios vary within a range width of about 0.1, it is seen that the range width is narrowed remarkably, compared to the case where the arithmetical mean roughness σ1 of the large end face is 0.02 μm.

It is clear from this result that the variability of the running torque of the tapered roller bearing can be suppressed by making the arithmetical mean roughness σ1 of the large end face be 0.04 μm or larger, and it can be said that the variability of the assembly torque which results when the tapered roller bearing is assembled and a preload is applied can also be suppressed. Namely, since the variability of the assembly torque can be suppressed in the event that the arithmetical mean roughness σ1 of the large end face is made to be 0.04 μm or larger, the generation of a variation in the value of the preload which is applied using the assembly torque as an indication can also be suppressed.

Note that when the arithmetical mean roughness σ1 of the large end face is 0.22 μm, the composite roughness a that is obtained by the equation (11) does not become 0.17 μm or smaller. When the arithmetical mean roughness σ1 of the large end face is larger than 0.1 μm, there may occur in a case where the composite roughness a does not become 0.17 μm or smaller, and there occurs a risk that the running torque increases. Due to this, the arithmetical mean roughness σ1 of the large end face is preferably made to be 0.04 μm or larger and 0.1 μm or smaller which corresponds to the range of roughnesses of which the effect was verified in the aforesaid test.

The arithmetical roughness σ2 of the large rib surface is preferably made to be in the range from 0.03 μm or larger to 0.1 μm or smaller. In the event that the arithmetical roughness σ2 of the large rib surface is larger than 0.1 μm, there may be caused a risk that the running torque of the tapered roller bearing increases. On the contrary, in the event that the arithmetical roughness σ2 of the large rib surface is smaller than 0.03 μm, there may be caused a risk that the variability of the running torque of the tapered roller bearing which includes the assembly torque thereof increases.

Relationship Between the Curvature Radiuses R1, R2 of the Large End Face and the Large Rib Surface, and the Running Torque Next, the results of an investigation test will be described which was carried out on effects imposed on the running torque of the tapered roller bearing by the curvature radius R1 of the large end face and the curvature radius R2 of the large rib surface 13 (refer to FIG. 2).

Figure 13:
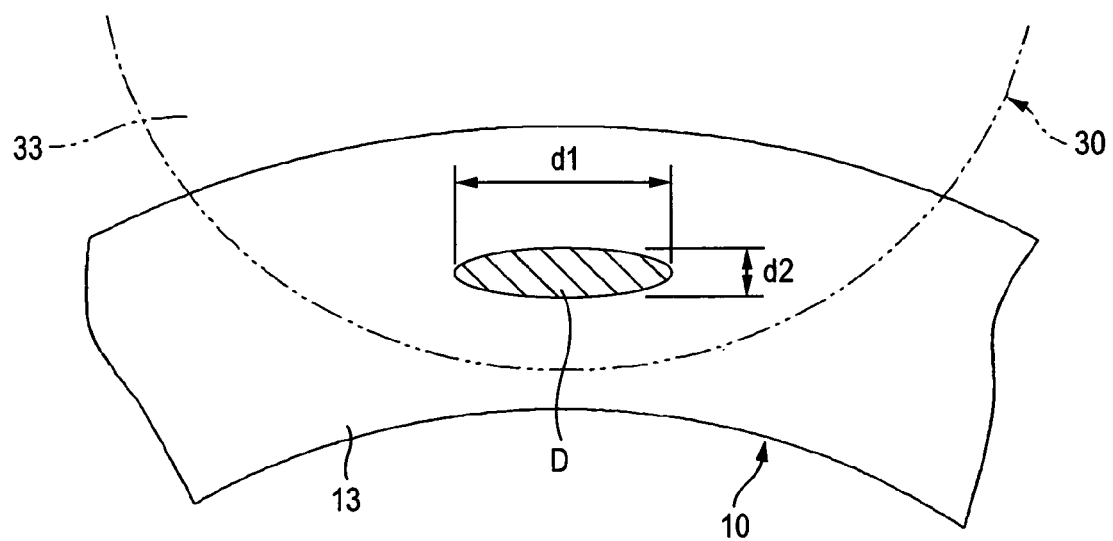
FIG. 13 is an exemplary diagram resulting when the large rib surface is viewed from a front thereof in a direction indicated by an arrow X in FIG. 2.

FIG. 13 is an exemplary diagram when the large rib surface is viewed from a front thereof in a direction indicated by an arrow X in FIG. 2. In the diagram, a hatched portion shows exemplarily a contact surface D between the large end face 33 and the large rib surface 13. When the inner and outer rings 10, 20 rotate relatively to each other, the large end face 33 and the large rib surface 13 rotate relatively to each other while sliding on this contact surface D.

Figure 14A:
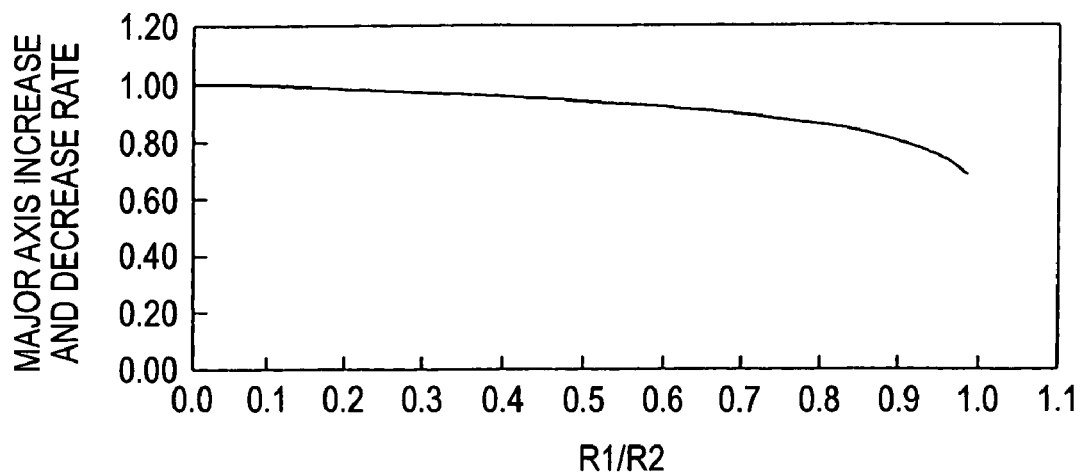
FIG. 14A is a graph showing a relationship between an increase and decrease rate of a major axis of a contact surface between the large end face and the large rib surface and R1/R2, which is a ratio of both curvature radiuses.
Figure 14B:
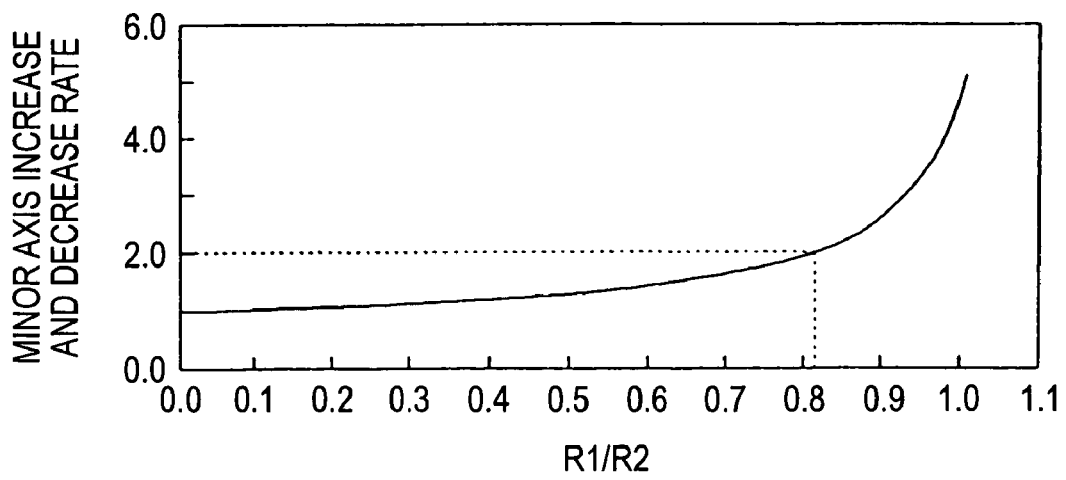
FIG. 14B is a graph showing a relationship between an increase and decrease rate of a minor axis and R1/R2, which is the ratio of the curvature radiuses.

This contact surface D is substantially an ellipse, and a major axis d1 and a minor axis d2 change depending on the value of R1/R2 which is a ratio between the curvature radius R1 of the large end face and the curvature radius R2 of the large rib surface. The results of a calculation of a relationship of the major axis d1 and the minor axis d2 and both the curvature radiuses R1, R2 are shown in FIGS. 14A and 14B. FIG. 14A is a graph showing a relationship between the increase and decrease rate of the major axis d1 and R1/R2 which is the ratio of both the curvature radiuses, and FIG. 14B is a graph showing a relationship between the increase and decrease rate of the minor axis d2 and R1/R2 which is the ratio of the curvature radiuses. Note that the increase and decrease rates of both the axes d1 and d2 are such as to represent the proportion of increase and decrease in ratio by assuming that the value of each axis is 1 when the value of R1/R2 is almost 0. Note that the aforesaid calculation was made based on the elastic contact theory of Hertz that is described in, for example, "Tedric A Harris/ROLLING BEARING ANALYSIS Third Edition p 153 to p 166."

According to FIG. 14A, while the increase and decrease rate of the major axis d1 slightly decreases as R1/R2 which is the ratio of both the curvature radiuses increases, no remarkable change is not identified. On the other hand, in FIG. 14B, while the increase and decrease rate of the minor axis d2 rises moderately until R1/R2 rises from 0 to the vicinity of 0.7, a remarkable rise is identified when R1/R2 rises at the vicinity of 0.8. Here, when the minor axis d2 increases and the major axis d1 decreases in association with an increase of R1/R2, the contact surface D is increased and the bearing pressure thereon is decreased. It is considered that this facilitates the formation of an oil film to thereby increase the lubricity. However, when the increase and decrease rate of the minor axis d2 becomes almost 2.0 or larger, the proportion of the change in minor axis d2 with respect to the change in R1/R2 increases rapidly. When the minor axis d2 becomes too large, there is caused a risk that the contact surface D protrudes into abrasion relief portion existing on a circumferential edge portion of the large rib surface of the inner ring. In case the protrusion occurs, a so-called edge load is produced between the tapered rollers and the inner ring, leading to a risk that the edge load so produced may cause an increase in the running torque which includes the assembly torque and an abnormal wear. Due to this, R1/R2, which is the ratio of both the curvature radiuses is preferably 0.8 or smaller.

Figure 15:
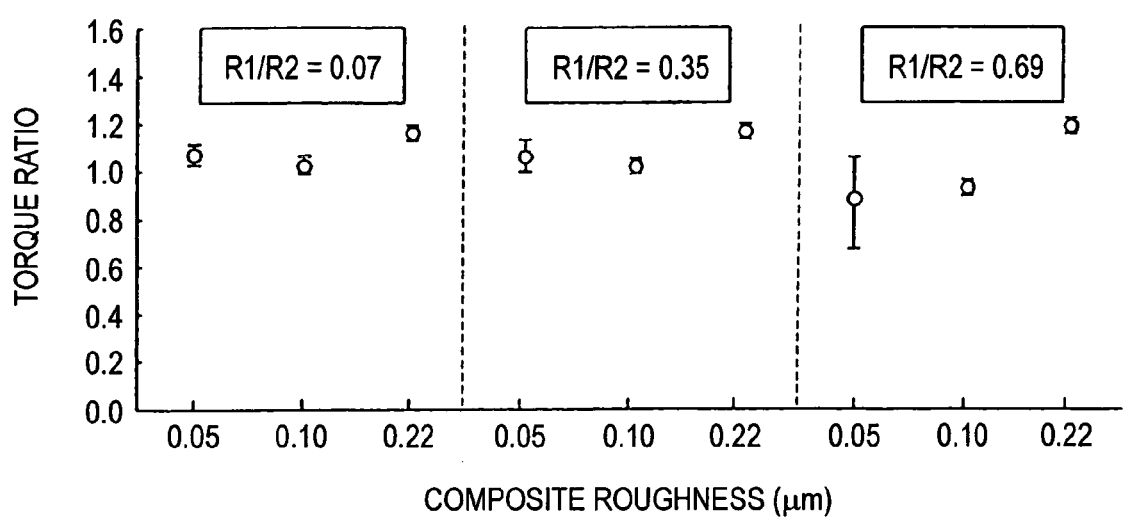
FIG. 15 is a graph showing the results of a measurement of running torque ratios of the tapered roller bearing relative to R1/R2 which is a ratio of both curvature radiuses which are set to predetermined values and a composite roughness.

FIG. 15 is a graph showing the results of a measurement of running torque ratios (running torque/predetermined value) of a plurality of tapered roller bearings in which the ratio of both the curvature radiuses, R1/R2, is set in a range of 0.8 or smaller. As a testing condition, a rust preventive oil was applied, an axial load of 5.5 kN was applied, a rotational speed of 50 rpm was used, and the room temperature (oil temperature) of 288 to 294 K (15 to 21° C.) was adopted, so that assembly torques of the tapered roller bearings could be measured artificially by this test, in the same manner as the above test.

In the diagram, the abscissa axis represents the composite roughness σ with respect to the ratio R1/R2 of both the curvature radiuses, which was set to three different predetermined values (0.07, 0.35, 0.69), and the ordinate axis represents the running torque ratio. In each torque ratio, a value resulting from the measurement is shown as a numerical value width so as to represent the variability of the composite surface ratio σ.

In all the results of the measurement shown in the graph, it can be verified that the running torque ratio varies within a relatively small range width.

In the diagram, when R1/R2 is 0.69 and the composite roughness σ is 0.05 μm, the running torque varies within a slightly wider range width as compared to the other settings. Due to this, R1/R2 is preferably 0.35 or smaller, in which case, the range width of the variability of the running torque including the assembly torque can be suppressed effectively.

When R1/R2 is made smaller than 0.07, the large rib surface 13 comes to have a curvature radius which is so large as to be regarded as almost a flat plane, and hence, the contact surface D between the large end face 33 and the large rib surface 13 is reduced. Consequently, the bearing pressure thereon increases, whereby the formation of an oil film therebetween becomes difficult, and the running torque tends to vary easily. Thus, R1/R2 is preferably 0.07 or larger.

The large end face of the tapered roller and the large rib surface of the inner ring are brought into contact with each other and rotate while sliding on each other as shown in FIG. 13 when the inner and outer rings rotate relatively to each other. Then, by running the tapered roller bearing, the large end face of the tapered roller and the large rib surface of the inner ring are made to have suitable surface states and shapes for sliding on each other by both being caused to wear slightly, and it is known that such advantages as reduction in contact bearing pressure and an increase in lubricity due to the formation of an oil film being facilitated can be obtained, whereby the running torque and resistance to seizing are stabilized.

Consequently, since the surface states and shapes of the large end face and the large rib surface are not stable immediately after the tapered roller bearing is assembled, it is understood that the assembly torque which results immediately after the tapered roller bearing is assembled varies.

Namely, the conditions in relation to the surface roughness and each of the curvature radiuses which are obtained by each of the investigation tests which were carried out by paying attention to the surface roughnesses and shapes of the large end face and the large rib surface are such as to make the shapes and surface roughnesses of the large end face and the large rib surface approximate to those adapted to sliding on each other immediately after the tapered roller bearing is assembled, and it is understood that by making the tapered roller bearing satisfy the conditions, the advantages of reduction in contact bearing pressure and increase in lubricity are obtained and the variation which tends to be produced in the assembly torque which results immediately after the tapered roller bearing is assembled can be suppressed.

By suppressing the variation of the assembly torque, the variation of a preload which is applied to the tapered roller bearing using the assembly torque as an indication when the bearing is assembled can be suppressed, and a normal preload can be imparted to the relevant tapered roller bearing. Since the normal preload can be applied to the tapered roller bearing, the insufficient rigidity of the bearing, reduced life of the bearing and generation of gear noise in the bearing can be suppressed which are all caused when the preload applied is excessive or insufficient. Furthermore, an increase in running torque can be suppressed which would otherwise occur in an actually used state due to the excessive preload. In other words, the running torque can be attempted to be reduced positively by imparting the normal preload.

In case where the tapered roller bearing according to the invention is assembled in an automotive pinion shaft supporting apparatus of a differential of a motor vehicle, for example, it is general to use its assembly torque as an indication for the application of a preload. Since a relatively high preload is applied to the tapered roller bearing which is built in the automotive pinion shaft supporting apparatus, there was a risk that the preload so applied varies largely as compared to other applications. For this reason, the tapered roller bearing according to the invention can be preferably used as a rolling bearing for use in an automotive pinion shaft supporting apparatus having a pinion shaft and rolling bearings which are disposed on a pinion gear side and an opposite side thereto of the pinion shaft to support the pinion shaft.

Thus, as described heretofore, the tapered roller bearing according to the invention can suppress the variability of the preload by setting it so as to fulfill the aforesaid conditions, so that the relevant preload can be set to a preferred value. By imparting the crownings which are set preferably as quantity on the rolling contact surface of the tapered roller and the raceway surfaces of the inner and outer rings, the contact area between the raceway surface and the rolling contact surfaces can be reduced suitably and the rolling viscous resistance between the inner and outer rings and the tapered rollers can be reduced, whereby the running torque of the relevant tapered roller bearing can be reduced effectively.

EXAMPLE

Next, the results of a comparison study will be described which was made using an example according to the invention and a comparison example in which specific numerical values were set, respectively. Main specification data of the example of the invention and the comparison example are shown in Table 1.

TABLE 1

| Bearing Specifications | | Example of Invention | Comparison Example |
|---|---|---|---|
| Main Dimensions | Bore Diameter (mm) | 34.9 | 34.9 |
| | Outside Diameter (mm) | 72.2 | 72.2 |
| | Width (mm) | 25.4 | 25.4 |
| Crowning | Outer Ring Crowning Amount (μm) | 40 | 7 |
| | Inner Ring Crowning Amount (μm) | 35 | 12 |
| | Roller Crowning Amount (μm) | 5 | 4 |
| | Total Crowning Amount (μm) | 85 | 27 |
| | Outer Ring Crowning Rate (%) | 47 | 26 |
| | Roller Crowning Rate (%) | 12 | 30 |
| | Inner Ring Crowning Rate (%) | 41 | 44 |
| Surface Roughness of Roller Large End Face ($\sigma1$, μm) | | 0.04 | 0.02 |
| Surface Roughness of Inner Ring Large Rib Surface ($\sigma2$, μm) | | 0.03 | 0.02 |
| Ratio between Curvature radius of Roller Large End Face and Curvature radius of Inner Ring Large rib surface (R1/R2) | | 0.31 | 0.86 |

As to the crowning, the example of the invention was set so as to fulfill the conditions (the total crowning amount is 50 μm or larger, the outer ring crowning rate is 40% or larger, the roller crowning rate is 20% or smaller). On the other hand, the comparison example was set to fall in a range of crowning values which does not fulfill the conditions.

As to the surface roughnesses of the large end face of the tapered roller and the large rib surface of the inner ring, the example of the invention was set such that the arithmetical mean roughness $\sigma1$ of the large end face fulfilled the condition (0.04 μm or larger) and the arithmetical mean roughness $\sigma2$ of the large rib surface fulfilled the condition (0.03 μm or larger). On the other hand, the comparison example was set such that the corresponding arithmetical mean roughness became smaller than the values of both the arithmetical mean roughnesses $\sigma1$, $\sigma2$, that is, set to numerical values which did not fulfill the aforesaid conditions.

As to the relationship between the curvature radiuses R1 and R2 of the large end face and the large rib surface, the example of the invention was set such that the R1/R2 fulfilled the condition (0.07 or larger and 0.8 or less). On the other hand, the comparison example was set such that the value of the R1/R2 is set larger not to fulfill the above condition.

Figure 16:
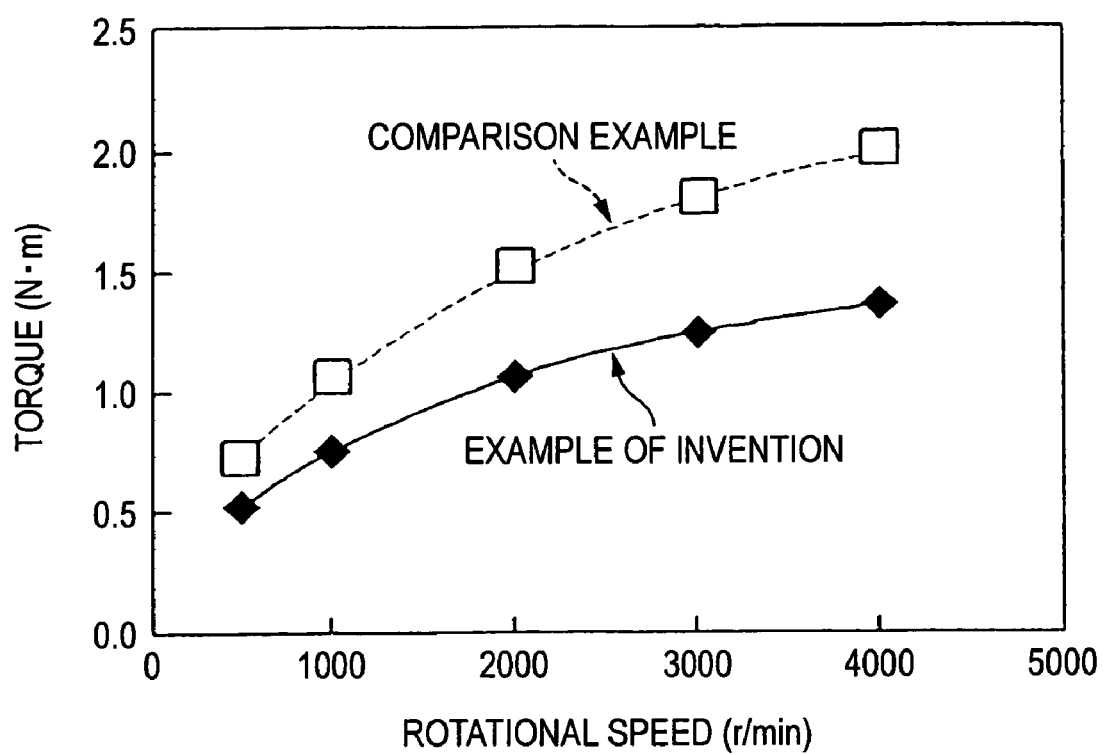
FIG. 16 is a graph showing the results of a measurement of running torques under a condition approximate to an actually used state using an example of the invention and a comparison example.

The results of a measurement of running torque are shown in FIG. 16 which was carried out under a condition close to an actually used state using the example of the invention and the comparison example. As a measuring condition of running torque in FIG. 16, the example of the invention and the comparison example were run in sufficiently, an axial load of 4 kN was applied, a rotational speed of 500 to 4000 rpm was used, and a gear oil of 85W-90 was supplied at an oil temperature of 50° C., so that a condition approximate to the actually used state was reproduced.

It could be verified from FIG. 16 that the running torque of the example of the invention was remarkably reduced over the full rotational speed range of 500 to 400 rpm, compared to the comparison example.

Figure 17:
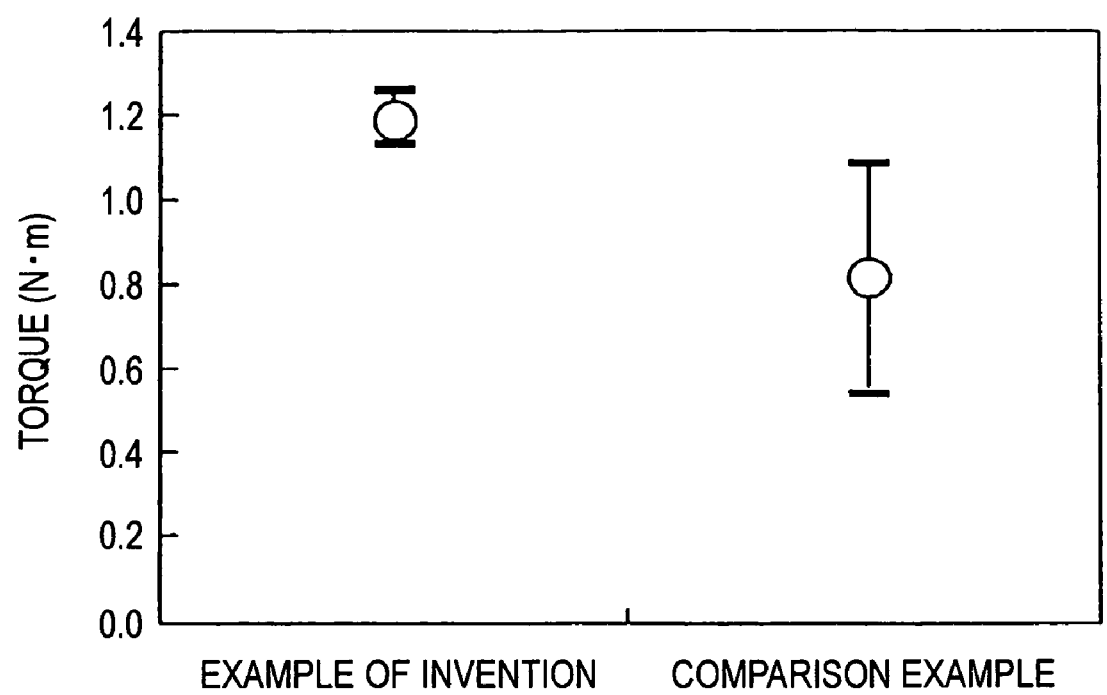
FIG. 17 is a graph showing the results of a measurement of running torques under a condition approximate to a condition resulting immediately after the tapered roller bearing is assembled when a preload is applied thereto using the example of the invention and the comparison example.

The results of a measurement of running torque are shown in FIG. 17 which was carried out under a condition approximate to the condition resulting immediately after the tapered roller bearing was assembled using the example of the invention and the comparison example. As a measuring condition of running torque in FIG. 17, an axial load of 5.5 kN was applied, a rotational speed of 50 rpm was used, and a rust preventive oil was applied at the normal temperature, so that the measuring condition of the assembly torque which is to be measured when the preload is imparted immediately after the tapered roller bearing has been assembled could be reproduced, and the assembly torque of the tapered roller bearing could be measured artificially.

It is seen from FIG. 17 that a range width of the running torque of the example of the invention is narrowed remarkably compared to the comparison example and that the variability of the running torque is suppressed largely.

In the example of the invention, the arithmetical mean roughness $\sigma1$ of the large end face was set to 0.04 μm, which was a lower limit value of the aforesaid condition (0.04 μm or larger), and the arithmetical mean roughness $\sigma2$ of the large rib surface was set to 0.03 μm, which was a lower limit value of the aforesaid condition (0.03 μm or larger), whereas in the comparison example, the arithmetical means roughnesses $\sigma1$, $\sigma2$ of the large end face and the large rib surface were set to values which were slightly lower than those of the example of the invention (both being set to 0.02 μm). Namely, it has been made clear that the variability of the running torque (the assembly torque) can be suppressed effectively by setting the tapered roller bearing of the invention such that the surface roughnesses of the large rib surface and the large end face fulfill the aforesaid conditions.

It is made clear from the results of the measurement of the running torques of the example of the invention and the comparison example that according to the invention, the reduction in running torque in the actually used state can be realized and the variability of the assembly torque which results immediately after the tapered roller bearing is assembled can be suppressed.

What is claimed is:

1. A tapered roller bearing comprising:
an outer ring including a crowned raceway surface;
an inner ring including a crowned raceway surface;
a plurality of tapered rollers that include crowned rolling contact surfaces and are interposed between the outer ring and the inner ring; and
a cage for the tapered rollers,
wherein when an arithmetical mean roughness as a surface roughness of a large end face of the tapered roller is $\sigma 1$ and an arithmetical mean roughness as a surface roughness of a large rib surface of the inner ring is $\sigma 2$,
$\sigma 1$ is 0.04 μm or larger,
a composite roughness that is expressed by a square root of a sum of a squared value of $\sigma 1$ and a squared value of $\sigma 2$ is 0.17 μm or smaller,
a total crowning amount, which is a sum of outer ring crowning amount, inner ring crowning amount and two times of roller crowning amount, is 50 μm or larger,
wherein the outer ring crowning amount is defined as $CRO=RCO-(RCO^2-(LRO/2)^2)^{1/2}$, wherein RCO is a radius of a crowning arc of the outer ring and LRO is a raceway length,
wherein the roller crowning amount is defined as $CR=RC-(RC^2-(LWR/2)^2)^{1/2}$, wherein RC is a radius of a crowning arc of the roller and LWR is a roller effective length, and
wherein the inner ring crowning amount is defined as $CRI=RCI-(RCI^2-(LRI/2)^2)^{1/2}$, where RCI is a radius of a crowning arc of the inner ring and LRI is a raceway length,
an outer ring crowning rate, which is a rate of the outer ring crowning amount on the total crowning amount, is 40% or larger, and
a roller crowning rate, which is a rate of two times of the roller crowning amount on the total crowning amount is 20% or smaller.

2. The tapered roller bearing as set forth in claim 1, wherein the arithmetical mean roughness $\sigma 1$ of the large end face of the tapered roller is 0.1 μm or smaller, and the arithmetical mean roughness $\sigma 2$ of the large rib surface of the inner ring is in the range from 0.03 to 0.11 μm.

3. The tapered roller bearing as set forth in claim 1, wherein the large rib surface of the inner ring is shaped into a concavely curved surface which is recessed axially, and
when a curvature radius of the large end face of the tapered roller is R1 and a curvature radius of the concavely curved surface is R2, a ratio between the two curvature radiuses which is expressed by R1/R2 falls within a range from 0.07 to 0.8.

4. The tapered roller bearing as set forth in claim 3, wherein the ratio between the two curvature radiuses which is expressed by R1/R2 falls within a range from 0.07 to 0.35.

5. The tapered roller bearing as set forth in claim 1, further comprising chamfered portions disposed at both ends of the rolling contact surfaces.

6. The tapered roller bearing as set forth in claim 1, further comprising chamfered portions disposed at both ends of the crowned raceway surface of the outer ring.

7. The tapered roller bearing as set forth in claim 1, wherein the total crowning amount is 100 μm or smaller.

8. The tapered roller bearing as set forth in claim 1, wherein a shape of the inner ring crowning comprises a composite crowning, which is a combination of a plurality of shapes.

9. An automotive pinion shaft supporting apparatus having a pinion shaft and rolling bearings which are disposed on a pinion gear side and an opposite side thereto of the pinion shaft to support the pinion shaft, respectively, wherein at least one of the rolling bearings which are disposed on the pinion gear side and the opposite side thereto of the pinion shaft, respectively, is made up of the tapered roller bearing according to claim 1.

10. A tapered roller bearing comprising:
an outer ring including a crowned raceway surface;
an inner ring including a crowned raceway surface; and
a plurality of tapered rollers that include crowned rolling contact surfaces and are interposed between the outer ring and the inner ring,
wherein a total crowning amount, which is a sum of an outer ring crowning amount, an inner ring crowning amount and two times of a roller crowning amount, is 50 μm or larger,
wherein the outer ring crowning amount is defined as $CRO=RCO-(RCO^2-(LRO/2)^2)^{1/2}$, wherein RCO is a radius of a crowning arc of the outer ring and LRO is a raceway length,
wherein the roller crowning amount is defined as $CR=RC-(RC^2-(LWR/2)^2)^{1/2}$, wherein RC is a radius of a crowning arc of the roller and LWR is a roller effective length, and
wherein the inner ring crowning amount is defined as $CRI=RCI-(RCI^2-(LRI/2)^2)^{1/2}$, where RCI is a radius of a crowning arc of the inner ring and LRI is a raceway length,
wherein an outer ring crowning rate, which is a rate of the outer ring crowning amount on the total crowning amount, is 40% or larger, and
wherein a roller crowning rate, which is a rate of two times of the roller crowning amount on the total crowning amount is 20% or smaller.

11. The tapered roller bearing according to claim 10, wherein when an arithmetical mean roughness as a surface roughness of a large end face of the tapered roller is $\sigma 1$ and an arithmetical mean roughness as a surface roughness of a large rib surface of the inner ring is $\sigma 2$, $\sigma 1$ is 0.04 μm or larger.

12. The tapered roller bearing according to claim 10, wherein when an arithmetical mean roughness as a surface roughness of a large end face of the tapered roller is $\sigma 1$ and an arithmetical mean roughness as a surface roughness of a large rib surface of the inner ring is $\sigma 2$, a composite roughness that is expressed by a square root of a sum of a squared value of $\sigma 1$ and a squared value of $\sigma 2$ is 0.17 μm or smaller.

13. The tapered roller bearing according to claim 10, further comprising chamfered portions disposed at both ends of the rolling contact surfaces.

14. The tapered roller bearing according to claim 10, further comprising chamfered portions disposed at both ends of the crowned raceway surface of the outer ring.

15. The tapered roller bearing according to claim 10, wherein the total crowning amount is 100 μm or smaller.

16. An automotive pinion shaft supporting apparatus comprising:
a tapered roller bearing comprising:
an outer ring including a crowned raceway surface;
an inner ring including a crowned raceway surface; and a plurality of tapered rollers that include crowned rolling contact surfaces and are interposed between the outer ring and the inner ring, wherein a total crowning amount, which is a sum of an outer ring crowning amount, an inner ring crowning amount and two times of a roller crowning amount, is 50 μm or larger, wherein the outer ring crowning amount is defined as $CRO=RCO-(RCO^2-(LRO/2)^2)^{1/2}$, wherein RCO is a radius of a crowning arc of the outer ring and LRO is a raceway length, wherein the roller crowning amount is defined as $CR=RC-(RC^2-(LWR/2)^2)^{1/2}$, wherein RC is a radius of a crowning arc of the roller and LWR is a roller effective length, and wherein the inner ring crowning amount is defined as $CRI=RCI-(RCI^2-(LRI/2)^2)^{1/2}$, where RCI is a radius of a crowning arc of the inner ring and LRI is a raceway length, wherein an outer ring crowning rate, which is a rate of the outer ring crowning amount on the total crowning amount, is 40% or larger, and wherein a roller crowning rate, which is a rate of two times of the roller crowning amount on the total crowning amount is 20% or smaller.

17. The automotive pinion shaft supporting apparatus according to claim 16, wherein when an arithmetical mean roughness as a surface roughness of a large end face of the tapered roller is σ1 and an arithmetical mean roughness as a surface roughness of a large rib surface of the inner ring is σ2, σ1 is 0.04 μm or larger.

18. The automotive pinion shaft supporting apparatus according to claim 16, wherein when an arithmetical mean roughness as a surface roughness of a large end face of the tapered roller is σ1 and an arithmetical mean roughness as a surface roughness of a large rib surface of the inner ring is σ2, a composite roughness that is expressed by a square root of a sum of a squared value of σ1 and a squared value of σ2 is 0.17 μm or smaller.

19. The automotive pinion shaft supporting apparatus according to claim 16, further comprising chamfered portions disposed at both ends of the rolling contact surfaces.

20. The automotive pinion shaft supporting apparatus according to claim 16, further comprising chamfered portions disposed at both ends of the crowned raceway surface of the outer ring.

21. The automotive pinion shaft supporting apparatus according to claim 16, wherein the total crowning amount is 100 μm or smaller.

* * * * *